(12) United States Patent
Inada et al.

(10) Patent No.: US 8,238,002 B2
(45) Date of Patent: Aug. 7, 2012

(54) IMAGE READING APPARATUS AND POWER CONTROL METHOD

(75) Inventors: Masakazu Inada, Kawasaki (JP); Tsuyoshi Homma, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 1163 days.

(21) Appl. No.: 11/461,881

(22) Filed: Aug. 2, 2006

(65) Prior Publication Data

US 2007/0030530 A1 Feb. 8, 2007

(30) Foreign Application Priority Data

Aug. 8, 2005 (JP) .................. 2005-230087

(51) Int. Cl.
H04N 1/46 (2006.01)
H04N 1/04 (2006.01)
(52) U.S. Cl. ....................... 358/509; 358/475
(58) Field of Classification Search ........... 358/400–498
See application file for complete search history.

(56) References Cited

U.S. PATENT DOCUMENTS

| | | | | |
|---|---|---|---|---|
| 4,734,760 A | * | 3/1988 | Futaki | 358/514 |
| 5,652,663 A | * | 7/1997 | Zelten | 358/447 |
| 5,736,973 A | * | 4/1998 | Godfrey et al. | 345/102 |
| 6,157,027 A | * | 12/2000 | Watanabe et al. | 250/234 |
| 6,239,421 B1 | * | 5/2001 | Nagata et al. | 250/208.1 |
| 7,796,310 B2 | * | 9/2010 | Hasegawa et al. | 358/488 |
| 2002/0181028 A1 | * | 12/2002 | Chung et al. | 358/474 |
| 2003/0222201 A1 | * | 12/2003 | Chiba et al. | 250/208.1 |

FOREIGN PATENT DOCUMENTS

JP 05-346570 12/1993
JP 2002-016744 1/2002

* cited by examiner

*Primary Examiner* — Dov Popovici
*Assistant Examiner* — Michael Tzeng
(74) *Attorney, Agent, or Firm* — Fitzpatrick Cella Harper & Scinto

(57) ABSTRACT

There are provided an image reading apparatus capable of turning on the light source of a display such as an LCD during an image reading operation even when the apparatus operates upon power supply from an external apparatus via a USB bus, and a power control method applied to the apparatus. For example, in the apparatus which is driven upon reception of power supply from the external apparatus, and includes a CIS for reading an original image by intermittently emitting light from an LED, and an LCD with a backlight for displaying information on reading, it is controlled to prevent the ON period of the light source and that of the backlight from overlapping each other during an image reading operation.

6 Claims, 6 Drawing Sheets

F I G. 2
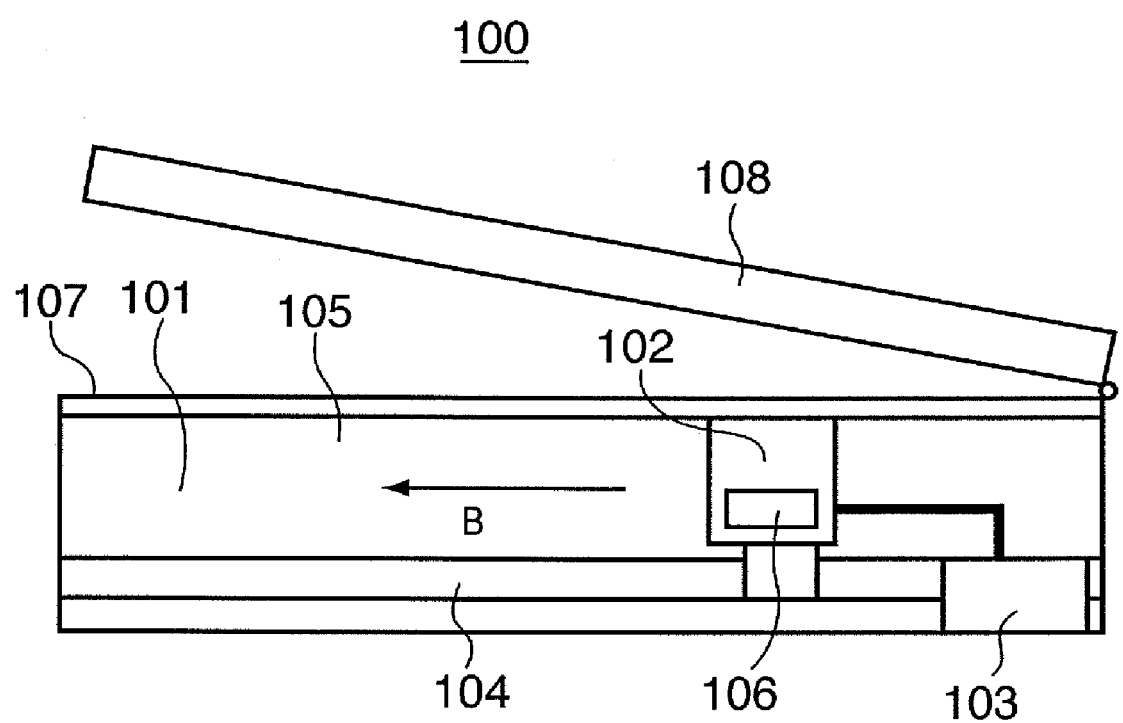

IMAGE READING APPARATUS AND POWER CONTROL METHOD

BACKGROUND OF THE INVENTION

1. Field of the Invention

This invention relates to an image reading apparatus and power control method. More particularly, this invention relates to an image reading apparatus which optically reads, e.g., an image printed on a sheet-like printing medium, and a power control method applied to the apparatus.

2. Description of the Related Art

Conventionally, some image reading apparatuses such as a scanner comprise an LCD (Liquid Crystal Display), and display text information and an image on the LCD screen upon reading an image, as disclosed in Japanese Patent Publication Laid-Open No. 2002-016744. Some LCD implement backlighting with low power consumption by controlling to time-divisionally turn on three (R, G, and B) light sources of the backlight of a color LCD, as disclosed in Japanese Patent Publication Laid-Open No. 5-346570.

In the prior arts, however, the backlight of the LCD is turned on upon reading an image, and then text information and an image are displayed. Thus, power for driving the LCD is required in addition to driving power necessary to read an image by the image reading apparatus.

In an image reading apparatus which is driven upon reception of power supply via a USB bus, the backlight of the LCD cannot be turned on in image reading due to the power limitation (5V, 500 mA) of the USB bus.

SUMMARY OF THE INVENTION

Accordingly, the present invention is conceived as a response to the above-described disadvantages of the conventional art.

For example, an image reading apparatus and a power control method applied to the apparatus according to the present invention are capable of performing both image reading and information display while suppressing instantaneous power consumption even when the image reading apparatus operates upon power supply from an external apparatus.

According to one aspect of the present invention, preferably, there is provided an image reading apparatus which is driven upon reception of power supply from an external apparatus to read an image on an original, comprising: reading means for optically reading the image on the original by intermittently emitting light of a light source to the original; display means for displaying an operating status of the apparatus on a screen by turning on a light source; and ON control means for controlling to prevent an ON period of the light source of the reading means and an ON period of the light source of the display means from overlapping each other during an image reading operation by the reading means.

A red LED, a green LED, and a blue LED are desirably used as the light source of the reading means.

It is desirable to control to sequentially and time-divisionally turn on the red LED, the green LED, and the blue LED during every line reading cycle of image reading.

The reading means desirably includes a contact image sensor including: a light source formed from the red LED, the green LED, and the blue LED; a light guide which uniformly irradiates the original with light from the light source; a linear sensor having a plurality of light receiving elements arranged in a first direction; and a rod lens array to focus an image of light reflected from the original onto the linear sensor, and scanning means for scanning the contact image sensor in a second direction perpendicular to the first direction.

The display means desirably includes an LCD, and the light source of the display means is desirably an LED serving as a backlight source of the LCD.

The ON control means may control to turn on the light source of the display means after all of the red LED, the green LED, and the blue LED are turned off during every line reading cycle. Alternatively, the ON control means may control to turn on the light source of the display means at an interval between an ON period of the red LED and an ON period of the green LED, at an interval between the ON period of the green LED and an ON period of the blue LED, and after an end of the ON period of the blue LED, during every line reading cycle. By this control, the light quantity of the light source is adjusted.

The ON control means desirably includes designation means for designating a light quantity of the light source of the display means, and adjustment means for adjusting an ON time of the light source of the display means in accordance with the designation while the light source is OFF.

Power is desirably supplied from the external apparatus via a USB bus.

According to another aspect of the present invention, preferably, there is provided a power control method for an image reading apparatus which is driven upon reception of power supply from an external apparatus, and includes reading means for optically reading an image on an original by intermittently emitting light of a light source of the reading means to the original, and display means for displaying information on reading on a screen by turning on a light source of the display means, comprising: controlling to turn on the light source of the display means while the light source of the reading means is OFF during an image reading operation by the reading means.

The invention is particularly advantageous since the light source of the display means for displaying information on reading is controlled to be turned on even in image reading while the image reading light source is OFF, preventing an instantaneous increase in power consumption even during the image reading period.

As a result, the backlight can be turned on even in an image reading apparatus, which operates upon power supply from an external apparatus via, e.g., a USB bus, in which power consumption is limited.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a side sectional view showing the internal configuration of the image reading apparatus shown in FIG. 1;

DESCRIPTION OF THE EMBODIMENT

A preferred embodiment of the present invention will now be described in detail in accordance with the accompanying drawings.

Note that building components described in the following embodiment are merely examples, and may not be construed to limit the scope of the present invention to them.

Figure 1:
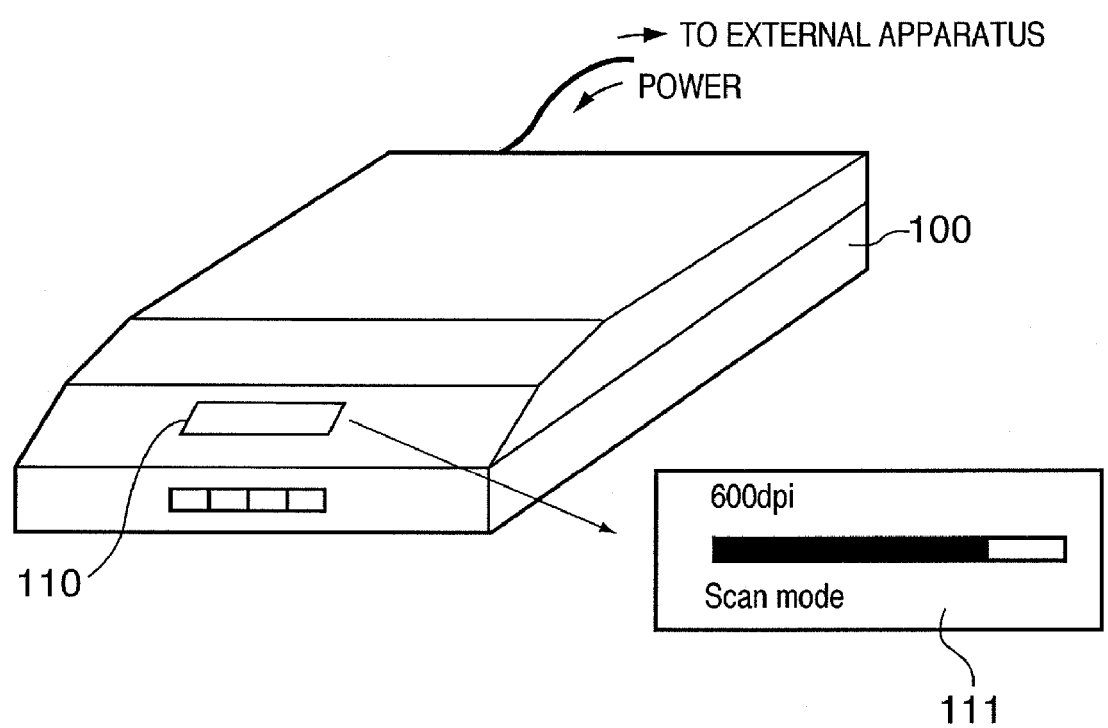
FIG. 1 is a perspective view showing the outer appearance of a flat bed type image reading apparatus as a typical embodiment of the present invention.

FIG. 1 is a perspective view showing the outer appearance of a flat bed type image reading apparatus 100 (optical scanner) as a typical embodiment of the present invention. As shown in FIG. 1, the image reading apparatus comprises an LCD 110 with a backlight. Upon reading an image, the backlight of the LCD 110 can be turned on to display simple text information and an image. An LCD display screen 111 shown in FIG. 1 displays the reading resolution, the scan mode, an indicator representing the progress of reading, and the like. The image reading apparatus 100 is connected to an external apparatus such as a host computer (to be referred to as a host hereinafter) via a USB interface. Power for operating the image reading apparatus is supplied from the external apparatus via the USB interface. A typical example of the host is a personal computer.

FIG. 2 is a side sectional view showing the internal configuration of the image reading apparatus 100 shown in FIG. 1.

As shown in FIG. 2, the image reading apparatus 100 is comprised of a main body 101, and a platen 108 which presses an original 107 to be read and cuts off external light. The main body 101 comprises an optical unit 102, a circuit board 103 which is electrically connected to the optical unit 102, a sliding rod 104 serving as a rail for scanning the optical unit 102, and an original table glass 105. The optical unit 102 is integrated with a contact image sensor (CIS) unit 106 which emits light to the original 107, receives light reflected from the original 107, and converts it into an electrical signal.

Upon reading an image, the optical unit 102 scans the original 107 set on the original table glass 105 in a direction (sub-scan direction) indicated by an arrow B, thereby reading an image on the original 107.

Figure 3:
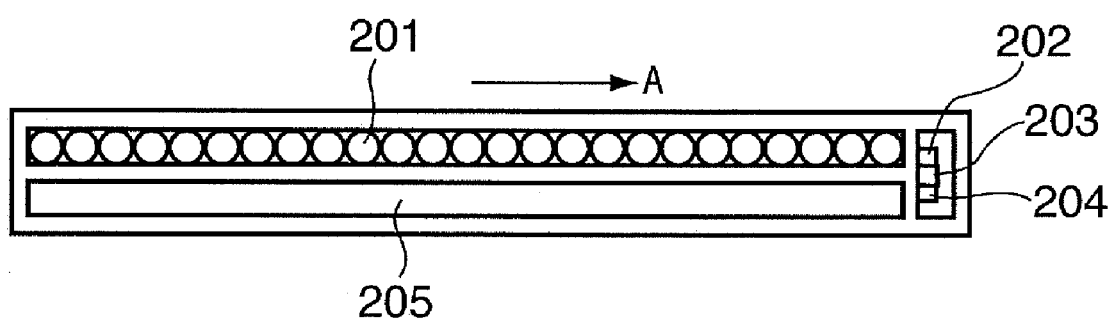
FIG. 3 is a side sectional view showing the detailed structure of an image sensor unit.

FIG. 3 is a side sectional view showing the detailed structure of the contact image sensor (CIS) unit 106.

As shown in FIG. 3, the CIS unit 106 comprises a red LED 202 which emits R (Red) light, a green LED 203 which emits G (Green) light, and a blue LED 204 which emits B (Blue) light. Upon reading an original, the LEDs of the respective colors are time-divisionally turned on every line. The original is uniformly irradiated with emitted light via a light guide 205. An image of light reflected from the original is focused by a rod lens array 201, and the focused light is converted into an electrical signal by a linear sensor (not shown) in which photoelectric transducers are arrayed in a main scan direction (which will be defined below) at the image focusing position. In this manner, image signals of one line formed from color signals of three R, G, and B color components are output. An image on the entire surface of the original is read by moving the CIS unit 106 in the sub-scan direction.

Note that the direction in which the photoelectric transducers of the linear sensor 201 are arrayed, i.e., the direction indicated by an arrow A representing the array direction of the rod lenses of the rod lens array 201 in FIG. 3 will be referred to as the main scan direction. The main scan direction and sub-scan direction are perpendicular to each other. In FIG. 2, the main scan direction is perpendicular to the surface of the drawing sheet.

Figure 4:
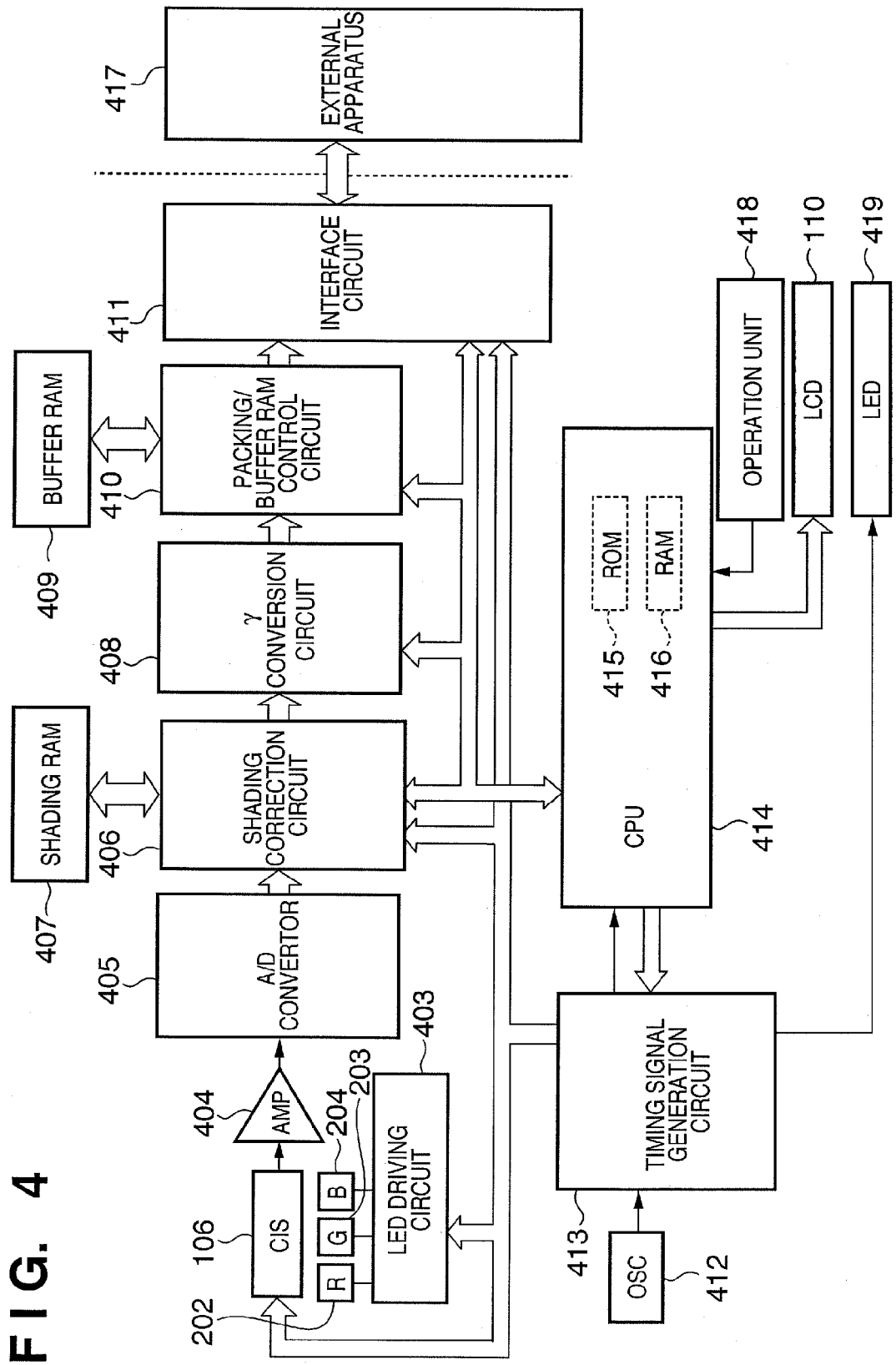
FIG. 4 is a block diagram showing the control configuration of the image reading apparatus shown in FIG. 1.

FIG. 4 is a block diagram showing the configuration of the control circuit of the image reading apparatus.

In FIG. 4, the same reference numerals as those shown in FIGS. 1 to 3 denote the same elements, and a description thereof will be omitted.

The CIS unit 106 line-sequentially reads a color image in the R, G, and B colors by switching and turning on the LEDs 202 to 204 of the respective colors every line by an LED driving circuit 403. The LEDs 202 to 204 are light sources capable of changing an irradiation light quantity toward the original. An amplifier (AMP) 404 amplifies a signal output from the CIS unit 106, and an A/D converter 405 A/D-converts the amplified electrical signal into a digital signal, and outputs, e.g., digital image data of 16 bits for each color component of each pixel.

A shading RAM 407 stores data used to perform shading correction by reading a reference white board (not shown) adhered onto the back surface of an index plate (not shown) adhered onto the original table glass 105 of the main body 101. Based on the data stored in the shading RAM 407, a shading correction circuit 406 performs a shading correction process for image data output from the A/D converter 405. A gamma conversion circuit 408 performs gamma conversion for the shading-corrected image data in accordance with a gamma curve set in advance by the host.

A buffer RAM 409 temporarily stores image data in order to adjust the timing of actual reading and that of communication with the host. A packing/buffer RAM control circuit 410 performs a packing process complying with an image output mode (binary, 8-bit gray, 24-bit color (8 bits for each of R, G, and B colors), or 48-bit color (16 bits for each of R, G, and B colors)) set in advance by the host. The packing/buffer RAM control circuit 410 writes the packed image data in the buffer RAM 409, reads the image data from the buffer RAM 409, and outputs it to an interface circuit 411.

The interface circuit 411 exchanges control data with an external apparatus 417 serving as a host, and outputs image data to it.

The series of processes as above is controlled by a CPU 414. This control is realized by reading out a processing program stored in a ROM 415 by the CPU 414, and executing the processing program using a RAM 416 as a work area.

In FIG. 4, reference numeral 412 denotes a reference signal oscillator (OSC) such as a quartz oscillator; and 413, a timing signal generation circuit which divides the output frequency of the reference signal oscillator 412 in accordance with the setting of the CPU 414 and generates various timing signals serving as references of the operation.

Reference numeral 418 denotes an operation unit which is comprised of operation buttons and connects its output signal to the input port of the CPU 414. Reference numeral 419 denotes an LED which serves as the backlight source of the LCD 110, and is ON-controlled by an ON signal output from the timing signal generation circuit 413.

LCD backlight control in the image reading apparatus having the above configuration will be explained in detail.

Figure 5:
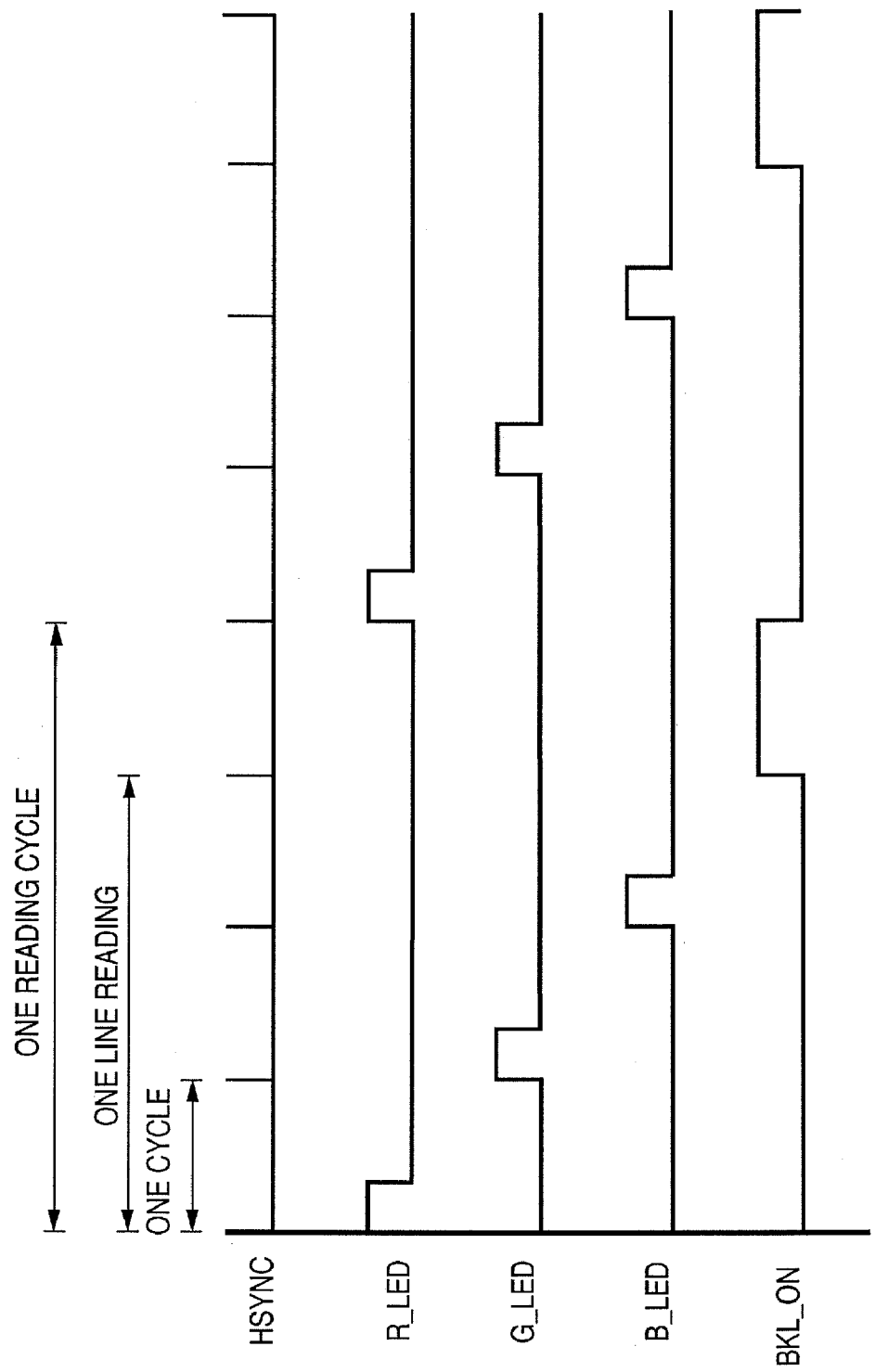
FIG. 5 is a timing chart showing an LCD backlight control sequence.

FIG. 5 is a timing chart showing an LCD backlight control sequence.

In FIG. 5, HSYNC represents a sync signal of the CIS unit 106, and the CIS unit 106 reads an image line by line in accordance with the sync signal HSYNC. R_LED, G_LED, and B_LED represent ON control signals for the LEDs serving as image reading light sources of the CIS unit 106, and the light quantity can be adjusted by changing the ON times of the LEDs 202 to 204 of the respective colors every line. The three LEDs are time-divisionally turned on. The ON time is set upon reading shading correction data, i.e., reading the reference white board for shading correction.

The cycle of the sync signal HSYNC is set with a margin of a predetermined time to the maximum ON times of the LEDs 202 to 204.

A BKL_ON signal is an ON control signal for the LED 419 serving as the backlight source of the LCD 110, and is controlled to turn on the backlight at the timings when the LEDs 202 to 204 of the respective colors are turned off, as shown in FIG. 5. In the example shown in FIG. 5, it is controlled to change the ON control signal BKL_ON to high level and turn on the LED 419 after the end of reading one line. Note that the period till the start of reading the next line is called one reading cycle.

Figure 6:
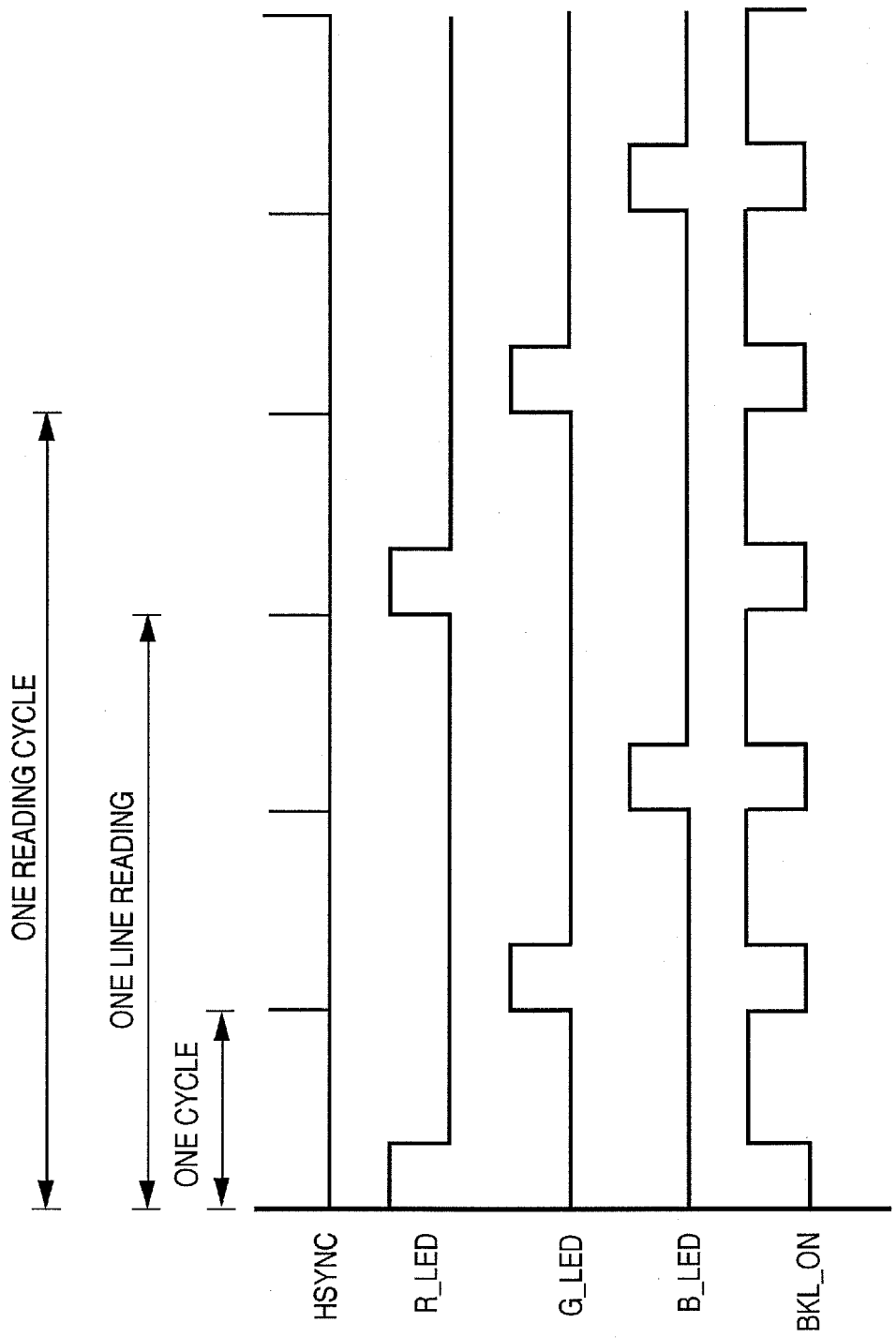
FIG. 6 is a timing chart showing another example of the LCD backlight control sequence.

FIG. 6 is a timing chart showing another example of the LCD backlight control sequence.

In the example shown in FIG. 6, it is controlled to turn on the LED 419 during reading of one line in the following periods. More specifically, the LED 419 is ON (1) until the green LED 203 is turned on after the red LED 202 is turned off, (2) until the blue LED 204 is turned on after the green LED 203 is turned off, and (3) until the red LED 202 is turned on for reading of the next line after the blue LED 204 is turned off. By this control, the light quantity of the backlight source of the LCD 110 increases, and a displayed image on the LCD can be more clearly identified even when the image reading apparatus is installed in a bright environment.

Although not shown, it is also possible to control to turn on the LED 419 until the green LED 203 is turned on after the red LED 202 is turned off, and until the blue LED 204 is turned on after the green LED 203 is turned off. This control can generate an intermediate light quantity between a light quantity obtained by performing the control shown in FIG. 5 and that obtained by performing the control shown in FIG. 6.

The light quantity of the backlight source of the LCD 110 can be adjusted with the button of the operation unit 418.

According to the above-described embodiment, it is controlled to turn on an LED serving as the backlight source of the LCD at the timing when the LEDs used as image reading light sources are turned off. This control can suppress instantaneous high power consumption without simultaneously emitting light from these LEDs. Even in an apparatus which receives limited power from a USB bus, the backlight of the LCD can be turned on.

Instead of the LCD and its backlight source, a display means for changing and displaying the ON patterns of a plurality of LEDs can also be adopted. In this case, an LED ON pattern driving circuit is necessary, but the LCD can be omitted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Publication Laid-Open No. 2005-230087, filed on Aug. 8, 2005, which is hereby incorporated by reference herein in its entirety.

What is claimed is:

1. An image reading apparatus which is driven upon reception of power supply from an external apparatus to read an image on an original, comprising:

reading means for optically reading the image on the original by electrically scanning a sensor in a first direction and mechanically scanning the sensor in a second direction perpendicular to the first direction, while intermittently emitting light of a light source of the reading means to the original during a reading cycle, wherein all of a red LED, a green LED, and a blue LED are included in the light source of the reading means;

display means for displaying an operating status of the image reading apparatus on a screen by turning on a light source of the display means at a timing when the light of the light source of the reading means is not emitted during the reading cycle and by turning off the light source of the display means at a timing before the light of the light source of the reading means is emitted during the reading cycle;

ON control means for controlling an ON period of the light source of said reading means and an ON period of the light source of said display means such that the light source of said reading means and the light source of said display means are alternately turned on and the ON period of the light source of said reading means and the ON period of the light source of said display means do not overlap each other during the reading cycle, wherein said ON control means controls to turn on the light source of said display means at an interval between an ON period of the red LED and an ON period of the green LED, at an interval between the ON period of the green LED and an ON period of the blue LED, and after an end of the ON period of the blue LED, during every line reading cycle of image reading; and reading control means for controlling to sequentially turn on the red LED, the green LED, and the blue LED such that the ON periods of the red LED, the green LED, and the blue LED do not overlap each other during every line reading cycle of image reading.

2. The image reading apparatus according to claim 1, wherein the sensor includes a contact image sensor including:

the light source of the reading means formed from the red LED, the green LED, and the blue LED;

a light guide which uniformly irradiates said original with light from the light source of the reading means;

a linear sensor having a plurality of light receiving elements arranged in the first direction; and a rod lens array to focus an image of light reflected from the original onto said linear sensor.

3. The image reading apparatus according to claim 1, wherein said display means includes an LCD, and the light source of said display means is an LED serving as a backlight source of the LCD.

4. The image reading apparatus according to claim 1, wherein said ON control means includes:

designation means for designating a light quantity of the light source of said display means; and adjustment means for adjusting an ON time of the light source of said display means in accordance with designation by said designation means while the light source of the reading means is OFF.

5. The image reading apparatus according to claim 1, wherein power is supplied from said external apparatus via a USB bus.

6. A power control method for an image reading apparatus which is driven upon reception of power supply from an external apparatus, and includes reading means for optically reading an image on an original by electrically scanning a sensor in a first direction and mechanically scanning the sensor in a second direction perpendicular to the first direction, while intermittently emitting light of a light source of the reading means to the original during a reading cycle, wherein all of a red LED, a green LED, and a blue LED are included in the light source of the reading means, and display means for displaying information on an operating status of the image reading apparatus on a screen by turning on a light source of the display means at a timing when the light of the light source of the reading means is not emitted during the reading cycle and by turning off the light source of the display means at a timing before the light of the light source of the reading means is emitted during the reading cycle, comprising:

controlling an ON period of the light source of the reading means and an ON period of the light source of the display means such that the light source of the reading means and the light source of the display means are alternately turned on and the ON period of the light source of the reading means and the ON period of the light source of the display means do not overlap each other during the reading cycle;

controlling to turn on the light source of the display means at an interval between an ON period of the red LED and an ON period of the green LED, at an interval between the ON period of the green LED and an ON period of the blue LED, and after an end of the ON period of the blue LED, during every line reading cycle of image reading; and controlling to sequentially turn on the red LED, the green LED, and the blue LED such that the ON periods of the red LED, the green LED, and the blue LED do not overlap each other during every line reading cycle of image reading.

\* \* \* \* \*